United States Patent

Sakai et al.

[11] Patent Number: 5,847,322
[45] Date of Patent: Dec. 8, 1998

[54] INSULATING TAPE OR SHEET

[75] Inventors: Hirokazu Sakai; Takayuki Shimizu; Ryuzo Asano; Naotoshi Miyahara, all of Komaki; Kiyoshi Furukawa, Amagasaki; Masaaki Nagai, Amagasaki; Hiromasa Honjo, Amagasaki; Hiroyuki Kamibayashi, Amagasaki, all of Japan

[73] Assignees: Tokai Rubber Industries, Ltd., Aichi; Mitsubishi Cable Industries, Ltd., Hyogo, both of Japan

[21] Appl. No.: 743,626

[22] Filed: Nov. 4, 1996

Related U.S. Application Data

[62] Division of Ser. No. 347,435, filed as PCT/JP94/00458 Mar. 22, 1994 published as WO94/22149 Sep. 29, 1994, Pat. No. 5,591,522.

[30] Foreign Application Priority Data

| Mar. 23, 1993 | [JP] | Japan | 5-64058 |
| Mar. 23, 1993 | [JP] | Japan | 5-64059 |
| Mar. 23, 1993 | [JP] | Japan | 5-64060 |
| Dec. 16, 1993 | [JP] | Japan | 5-316819 |

[51] Int. Cl.$^6$ .................. B32B 7/12; H01B 7/00
[52] U.S. Cl. .................. 174/110 R; 174/110 N; 428/353; 428/483; 428/343
[58] Field of Search ................. 428/343, 353, 428/354, 355 EN, 483; 427/208.8; 174/251, 259, 110 R, 110 N

[56] References Cited

U.S. PATENT DOCUMENTS

| 2,721,855 | 10/1955 | Kin | 260/46.5 |
| 3,750,081 | 7/1973 | Miller | 338/174 |
| 3,794,556 | 2/1974 | Young | 161/206 |
| 4,084,035 | 4/1978 | Arpin | 428/353 X |
| 4,115,617 | 9/1978 | Mitsuishi et al. | 428/343 X |
| 4,298,642 | 11/1981 | Walter | 428/343 X |
| 4,743,503 | 5/1988 | Lin et al. | 428/353 |
| 4,996,650 | 2/1991 | Lange et al. | 427/409 |
| 5,242,757 | 9/1993 | Buisine et al. | 428/483 X |
| 5,501,897 | 3/1996 | Ichikawa et al. | 428/354 X |
| 5,591,522 | 1/1997 | Sakai et al. | 428/353 |

FOREIGN PATENT DOCUMENTS

| 56-60246 | 5/1981 | Japan. |
| 59-179680 | 10/1984 | Japan. |
| 60-35072 | 2/1985 | Japan. |
| 61-194220 | 12/1986 | Japan. |
| 2-51540 | 2/1990 | Japan. |

OTHER PUBLICATIONS

J 59–179,680 Patent Abstract; Oct. 12, 1984.

J 56–060,246 Patent Abstract; May 25, 1981.

J 60–035,072 Patent Abstract; Feb. 22, 1985.

JP 02–051,540 Patent Abstract; Feb. 21, 1990.

*Primary Examiner*—Daniel Zirker
*Attorney, Agent, or Firm*—Wenderoth, Lind & Ponack

[57] ABSTRACT

An insulating tape or sheet comprising a polyester film layer and a polyolefin adhesive layer having a flexural modulus of 500–20000 kgf/cm$^2$. The insulating tape or sheet of the present invention can provide an insulated wire having superior buckling resistance and is very low in cost.

10 Claims, 3 Drawing Sheets

Compression distance

INSULATING TAPE OR SHEET

This is a divisional application of Ser. No. 08/347,435 filed Nov. 23, 1994, which is the national phase of PCT/JP94/00458 filed Mar. 22, 1994, published as WO94/22149 Sep. 29, 1994, now U.S. Pat. No. 5,591,522.

TECHNICAL FIELD

The present invention relates to an insulating tape or sheet. More specifically, the present invention relates to an insulating tape or sheet suitably used, in particular, as an insulating material etc. for an insulated wire to be used for electric wiring in electric equipments, electronic equipments and automobiles, and indoor and outdoor wirings.

BACKGROUND ART

Conventionally, an insulating tape or sheet has been used for covering a conductor in an electric wire for insulating and protecting same. It comprises an adhesive layer formed on a polyester film, which is a substrate for the tape or sheet. Various adhesives such as polyolefins, thermosetting resins and polyester adhesives have been used for the aforementioned adhesive layer.

Of the aforementioned adhesives, polyolefin adhesives are advantageous in that they do not cure at room temperature, permitting easy handling thereof, and are most inexpensive in cost.

When an insulating tape or sheet having a polyolefin adhesive layer is used as an insulating material for an insulated wire to be used under severe conditions in the electric system of, for example, an automobile, however, the wire is susceptible to trouble due to the deformation and breakage of the wire, which is caused by a physical impact. When the wire is used in a bent state for a long time, moreover, the insulated wire experiences insulation failure due to the partial separation of the insulating layer from the adhesive layer in the insulating tape or sheet, or between the tape or sheet and the conductor, or due to the occurrence of cracks in the tape or sheet, posing problems to be solved.

DISCLOSURE OF THE INVENTION

Accordingly, the present invention aims at providing an insulating tape or sheet having a polyolefin adhesive layer permitting low production cost, which is usable as an insulating material for an insulated electric wire free of trouble or insulation failure even if it is used under severe conditions.

The present invention aims at providing an insulating tape or sheet useful as an insulating material for the above-mentioned insulated wire, the tape or sheet being particularly superior in adhesiveness under high temperature conditions (heat resistance) and in the presence of water (hot water) (water resistance).

The present invention further aims at providing an insulating tape or sheet useful as an insulating material for an insulated wire, which is superior in adhesiveness and voltage resistance characteristics when used under severe conditions of, for example, heat aging in a folded state and subsequent restoration to its original shape.

With the aim of achieving the above-mentioned objects, the present inventors have conducted various studies and found that the trouble such as breakage of wire and insulation failure of the insulated wire, which is composed of an insulating tape or sheet having a polyolefin adhesive layer as an insulating material, are ascribed to an inferior buckling resistance of the wire comprising such tape or sheet.

Further studies have revealed that the inferior buckling resistance is not caused by the polyolefin adhesive in the insulating tape or sheet or polyester film itself, but caused by the great difference in flexural modulus between the adhesive layer and the film layer, and that the above-mentioned objects can be achieved by setting the flexural modulus of the polyolefin adhesive layer for a specific range, which resulted in the completion of the present invention.

That is, the present invention relates to an insulating tape or sheet comprising a polyester film layer and a polyolefin adhesive layer having a flexural modulus of from 500 to 20000 $Kgf/cm^2$.

According to the present invention, an insulated wire having a superior buckling resistance and an insulating tape or sheet markedly inexpensive in cost can be provided.

In addition, the use of an anchor coating agent, comprising a silane-modified polyolefin resin or organic titanium compound as a main component, in the aforementioned tape or sheet as an anchor coat layer enables provision of an insulated wire having a superior buckling resistance, and further, an insulating tape or sheet having superior heat resistance, water resistance and voltage resistance characteristics.

The present invention is described in detail in the following.

The insulating tape or sheet (hereinafter referred to as polyolefin insulating tape) having a polyolefin adhesive layer of the present invention comprises a polyester film layer and a polyolefin adhesive layer and, where necessary, an anchor coat layer between the above-mentioned film layer and the adhesive layer.

The polyester film to be used as a substrate for the insulating tape is subject to no particular limitation and those conventionally known may be used. The thickness of the film layer is generally 0.012–0.2 mm, preferably 0.025–0.1 mm in view of durability, flexing property and electric insulation property.

The polyolefin adhesive forming the adhesive layer is subject to no particular limitation and, for example, grafted polymers of high density polyethylene (HDPE), low density polyethylene (LDPE), linear low density polyethylene (L-LDPE), ultra-low density polyethylene or polypropylene (PP) with unsaturated carboxylic acid (e.g. acrylic acid, methacrylic acid, maleic acid, fumaric acid, itaconic acid, crotonic acid, citraconic acid) or acid anhydride (e.g. maleic anhydride, itaconic anhydride, citraconic anhydride), ethylene copolymers such as ethylene-vinyl acetate copolymer (EVA), ethylene-ethyl acrylate copolymer (EEA), ethylene-methacrylic acid copolymer (EMAA) and ethylene-vinyl acetate-glycidyl methacrylate copolymer (E-VA-GMA), graft copolymers of these copolymers with alkoxysilane (e.g. methoxysilane, ethoxysilane, butoxysilane), the above-mentioned unsaturated carboxylic acid or acid anhydride, ionomer (e.g. ethylene-acrylic acid metal ion copolymer, ethylene-methacrylic acid metal ion copolymer) and the like may be used.

While the thickness of the adhesive layer is not particularly limited, it is preferably set for 0.03–0.2 mm in view of the below-noted flexural modulus and particularly preferably 0.05–0.1 mm in view of processability, economic aspect, the adhesion between the polyester film layer and the adhesive layer and electric insulation property.

In the present invention, the flexural modulus of the adhesive layer is set for 500–20000 $Kgf/cm^2$. When the flexural modulus is less than 500 $Kgf/cm^2$, the difference in the flexural modulus between the adhesive layer and the polyester film becomes so great as to cause poor buckling resistance of an insulated wire comprising such insulating tape, which causes deformation of the wire due to buckling when a physical impact is applied. In addition, it makes the use of the tape in a bent state difficult, rendering its use for complicated wiring and detailed wiring unattainable. In particular, when the flexural modulus exceeds 20000 Kgf/cm², flexibility of the adhesive layer, as well as adhesiveness of the adhesive layer to metal (conductor) and polyester film become poor, possibly impairing the original function of the insulating tape. The above-mentioned flexural modulus is preferably 1500–15000 kgf/cm², particularly preferably 2500–10000 kgf/cm², in view of easy bending work in the absence of microwrinkles which occur in use upon bending.

The aforementioned flexural modulus of the adhesive layer is measured by the following method in reference to the bending test of hard plastic, JIS-K7203.

That is, a test sample of 80 mm (length)×10 mm (width) ×1 mm (thickness) is prepared from a polyolefin adhesive by heat press. As shown in FIG. 1, the obtained test sample 1 is placed on two support bases 3, whereon a pressure wedge 2 is lowered at a constant speed (5 mm/min), and the load-deflection curve at that time is recorded on a chart, based on which the flexural modulus is calculated by the following formula.

$$E=[L^3/(4 \times bh^3)] \times F/Y$$

wherein E is flexural modulus (kgf/cm²), L is distance (cm) between fulcrums, b is width (cm) of a test sample, h is thickness (cm) of the test sample, F is load (kgf) on an optionally selected point in the initial linear portion of the load-deflection curve and Y is deflection (cm) against load F.

Of the aforementioned polyolefin adhesives, a grafted polymer of L-LDPE with maleic acid, which has a melting point of 110°–130° C. and affords 2500–6000 kgf/cm² of flexural modulus when formed into an adhesive layer, is preferably used.

The above-mentioned insulating tape may comprise an anchor coat layer between the polyester film layer and the adhesive layer for an enhanced adhesiveness.

The anchor coat layer is subject to no particular limitation insofar as it can achieve the object of the invention. For example, urethane anchor coating agent conventionally used may be applied. When an urethane anchor coating agent is used, the thickness of the anchor coat layer is generally 0.1–30 μm, preferably 0.3–20 μm.

When heat resistance and water resistance are particularly required, the anchor coat layer is preferably formed with the use of an anchor coating agent comprising a silane-modified polyolefin resin as a main component. The silane-modified polyolefin resin is not particularly limited and those conventionally known may be used. For example, EEA and EVA grafted with an alkoxysilane such as methoxysilane, ethoxysilane and butoxysilane are among the examples. The silane-modified polyolefin resin has high affinity for both the polyolefin adhesive layer and the polyester film and is superior in heat resistance and water resistance. Accordingly, a silane-modified polyolefin resin anchor coat layer between the polyester film and the adhesive layer is conducive to the sufficient adhesion between the polyester film and the adhesive layer, and to the provision of an insulating tape or sheet having superior heat resistance and water resistance.

When an anchor coat layer is formed with a silane-modified polyolefin resin, the thickness of the layer is generally 3–30 μm, preferably 5–20 μm.

When adhesiveness and voltage resistance characteristics are particularly required, the anchor coat layer is preferably formed with an anchor coating agent comprising an organic titanium compound as a main component. The organic titanium compound to be used in the present invention is exemplified by an alkyl titanate of the formula $$Ti(OR)_4$$

wherein R may be the same or different and each is alkyl having 1 to 27, preferably 3–19 carbon atoms or allyl. Specifically, the following compounds are exemplified, which may be used alone or in combination.

tetra-i-propyltitanate [Ti(O-i-C$_3$H$_7$)$_4$]
tetra-n-butyltitanate [Ti(O-n-C$_4$H$_9$)$_4$]
tetra(2-ethylhexyl)titanate {Ti[(OCH$_2$CH(C$_2$H$_5$)C$_4$H$_9$]$_4$}
tetrastearyl titanate [Ti(OC$_{18}$H$_{37}$)$_4$]

An anchor coat layer composed of an anchor coating agent containing an organic titanium compound as a main component is subject to dissociation of —OR group in the molecule of the titanium compound by hydrolysis and becomes a colorless, transparent and extremely thin high molecular titanium oxide film having a structure similar to that of titanium oxide (TiO$_2$). When an anchor coat layer is formed with the use of an organic titanium compound, the thickness of the layer is generally 0.0005–10.0 μm, preferably 0.001–2.0 μm.

When flame resistance is desired for the insulating tape or sheet of the present invention, a flame retarder may be contained in the polyolefin adhesive layer. It has been confirmed that the addition of a flame retarder to the adhesive does not result in adverse influence on the improvements of the aforementioned properties. The flame retarder may be a conventional one and is exemplified by halogen flame retarders such as bromine-containing flame retarders (e.g. decabromodiphenyl ether, hexabromobenzene, tetrabromobisphenol A, a derivative thereof, pentabromobenzyl polyacrylate), chlorine-containing flame retarders (e.g. chlorinated paraffin, perchlorocyclopentadecane, tetrachlorophthalic anhydride, chlorendic acid) and halogen-containing phosphoric anhydride ester, and non-halogen flame retarders such as inorganic flame retarders (e.g. aluminum hydroxide, magenesium hydroxide) and phosphorous flame retarders (e.g. phosphoric ester). Of these, non-halogen flame retarders are preferable.

Where necessary, an auxiliary flame retarder such as antimony trioxide and zinc borate may be also used.

The flame retarder is preferably used in a proportion of 20–250 parts by weight, more preferably 50–200 parts by weight per 100 parts by weight of the polyolefin adhesive.

In addition, various additives conventionally used for polyolefin adhesive, such as inorganic fillers (e.g. titanium dioxide, talc, alumina), antioxidants, copper inhibitors, ultraviolet absorbers and the like may be used as necessary.

The insulating tape or sheet of the present invention can be produced by a known method by using the aforementioned starting materials.

When a flame retarder needs to be added to polyolefin adhesive pellets, the predetermined amounts thereof are added and kneaded in a biaxial mixer, cooled with water and cut into pellets again.

When an urethane anchor coating agent or an anchor coating agent containing an organic titanium compound as a main component is used, it is dissolved in a solvent such as toluene, MEK, ethyl acetate or the like, into a 3–5% by weight solution when an organic titanium compound is used, and the obtained solution is applied to a polyester film by a known method such as roll coating (e.g. gravure roll coating, reverse roll coating) and spray coating, followed by evaporation of the solvent by passing the film through a fired dryer to form an anchor coat layer. When a silane-modified polyolefin resin is used as an anchor coating agent, the resin in pellets is laminated by extrusion on a polyester film by a T-die extruder.

The polyolefin adhesive pelleted in advance is extrusion-laminated, by a T-die extruder, on a polyester film on which an anchor coat layer has been formed. When a silane-modified polyolefin resin is used as an anchor coating agent, the resin and the polyolefin adhesive may be simultaneously extrusion-laminated on the polyester film.

When an anchor coat layer is not desired, adhesive pellets are directly extrusion-laminated on the polyester film.

In this way, a three-layer insulating tape or sheet, or a two-layer insulating tape or sheet can be obtained. The insulating tape or sheet thus obtained may be reinforced with cloth, glass cloth etc.

The insulating tape or sheet of the present invention, when having a specific flexural modulus of 500–20000 kgf/cm$^2$, can contribute to an improved buckling resistance of an insulated wire comprising said tape or sheet, which in turn obviates possible buckling of the wire on application of a physical impact thereon under general use conditions, and occurrence of an accident such as breakage of the wire.

Moreover, the use of a silane-modified polyolefin resin as an anchor coating agent results in an insulating tape or sheet having properties sufficient to endure the severe conditions under which it is used, particularly having superior heat resistance and water resistance, which are attributable to the anchor coat layer having superior heat resistance and water resistance and capable of maintaining high adhesiveness between the polyester film and the polyolefin adhesive layer.

The use of an organic titanium compound as an anchor coating agent is advantageous in that the extreme thinness thereof makes deformation of the tape or sheet difficult, the high adhesion between the adhesive layer and the polyester film can be maintained and that the anchor coat layer is imparted with superior heat resistance and water resistance. Accordingly, when an insulated wire comprising said insulating tape is folded and then restored to its original shape, the wire is free of microfloat or peeling between the anchor coat layer and the adhesive layer, thus affording a tape or sheet with improved adhesiveness and voltage resistance characteristics.

Moreover, the polyolefin adhesives are easy to handle and markedly low in cost, as compared with thermosetting resins and polyester adhesives.

In summary fashion, the insulating tape or sheet of the present invention has superior physical properties and electric characteristics and is markedly low in cost.

The insulating tape of the present invention is explained in more detail by illustrating Examples and Comparative Examples in the following.

EXAMPLES 1–5

Comparative Example 1

An urethane anchor coating agent was applied to a 50 μm thick polyester film with a gravure roll coater to form a 3 μm thick anchor coat layer. The polyolefin adhesives as shown in Table 1 and additives as shown in Table 2 were mixed in a ratio indicated in Table 3, and the mixtures were kneaded in a biaxial kneader, cooled with water and cut to give adhesive pellets. The adhesive pellets were extrusion-laminated, by a T-die extruder, on the anchor coat layer formed on the polyester film to give an insulating tape having a 80 μm thick adhesive layer.

TABLE 1

| | kind | properties |
|---|---|---|
| a | EVA | MI = 9.0, vinyl acetate content = 12% by weight, mp = 86° C. |
| b | acid*-modified L-LDPE | MI = 3.0, mp = 120° C. |
| c | acid**-modified PP | MI = 2.3, mp = 135° C. |
| d | blend (70:30 by weight) of acid modified L-LDPE and acid*** modified HDPE | |

MI: melt index (g/10 min)
mp: melting temperature
*: maleic anhydride
**: maleic anhydride
***: maleic anhydride

TABLE 2

| Additives | |
|---|---|
| bromine flame retarder | hexabromobenzene |
| chlorine flame retarder | perchlorocyclopentadecane |
| auxiliary flame retarder | antimony trioxide |
| inorganic filler | titanium dioxide |
| antioxidant | hindered phenol compound* |
| copper inhibitor | 3-(N-salicyloyl)amino-1,2,4-triazole |

*: tetrakis[methylene-3-(3',5'-di-tert-butyl-4'-hydroxy-phenyl)propionate]methane

TABLE 3

| Example No. | 1 | 2 | 3 | 4 | 5 | Com. Ex. 1 |
|---|---|---|---|---|---|---|
| polyolefin adhesive | | | | | | |
| content | 100 | 100 | 100 | 100 | 100 | 100 |
| kind | a | b | b | c | d | a |
| bromine flame retarder | 40 | — | — | 40 | 100 | — |
| chlorine flame retarder | — | — | 100 | — | — | — |
| auxiliary flame retarder | 10 | — | 50 | 10 | 30 | — |
| inorganic filler | — | — | 10 | — | — | — |
| antioxidant | — | — | 0.5 | — | — | — |
| copper inhibitor | — | — | 0.5 | — | — | — |

Note:
The contents of the adhesive and the additives are all in parts by weight.

The flexural modulus of the adhesive layers of the thus-obtained insulating tapes of Examples 1–5 and Comparative Example 1, and buckling resistance of the tapes as evaluated by the following method are shown in Table 4.

Buckling resistance

Figure 1:
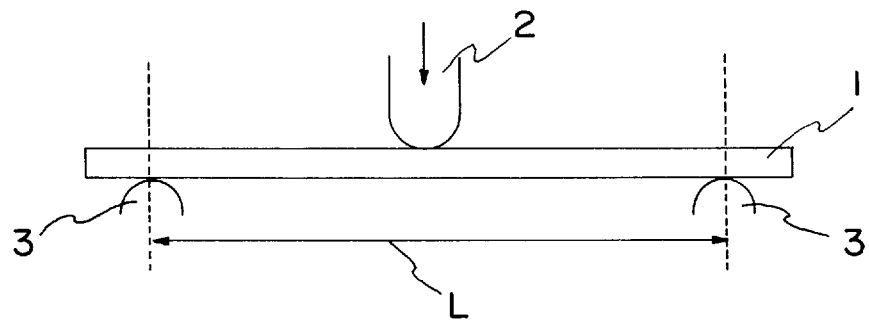
FIG. 1 explains measurement of flexural modulus.
Figure 2:
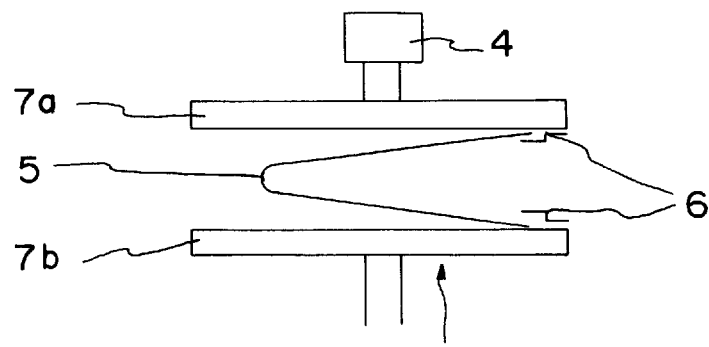
FIG. 2 explains evaluation of buckling resistance.
Figure 3:
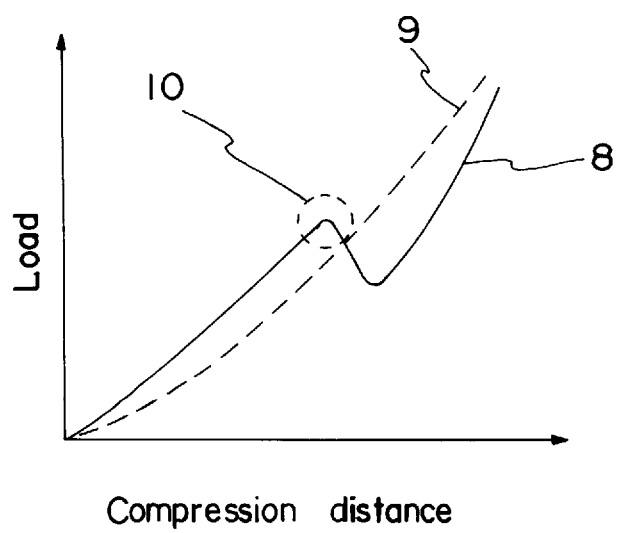
FIG. 3 is a load-compression distance curve obtained in the evaluation of buckling resistance.

Two insulating tapes were adhered in such a way as to allow contact of the adhesive layers by the heat roll laminate method to give a test sample consisting of two 50 mm (width)×150 mm (length) insulating tapes in integrity. The laminating conditions were roll temperature 175° C., laminate speed 0.5 mm/min and laminate linear load 6.0 kgf/cm and used were three pairs of 80 mm diameter silicone rubber rolls. The test sample obtained was subjected to the evaluation of buckling resistance by a stroke graph (R-2 type, manufactured by Toyo Seiki Corp.). As shown in FIG. 2, a test sample 5 was placed between two support bases 7a and 7b and fixed with a tape 6. A compression force was applied by moving the support base 7b toward the direction of an arrow at a constant speed until the test sample 5 is completely bent. The load-compression distance curve at that time was recorded on a chart. In FIG. 2, 4 is a load cell. An example of the load-compression distance curve is shown in FIG. 3. In FIG. 3, a curve 9 is without buckling and a curve 8 is with buckling. The curve 8 has a peak 10 indicating buckling. Accordingly, the buckling resistance was evaluated by the possible appearance of the peak, which was expressed by X, meaning presence of buckling, and by ○, meaning absence of buckling.

TABLE 4

| Example No. | 1 | 2 | 3 | 4 | 5 | Comp. Ex. 1 |
|---|---|---|---|---|---|---|
| flexural modulus | 500 | 2600 | 7700 | 10600 | 19200 | 420 |
| buckling resistance | ○ | ○ | ○ | ○ | ○ | X | flexural modulus: flexural modulus (kgf/cm²) of polyolefin adhesive layer

Examples 6–10

Comparative Example 2

In the same manner as in Example 1 (Example 6), Example 2 (Example 7), Example 3 (Example 8), Example 4 (Example 9), Example 5 (Example 10) and Comparative Example 1 (Comparative Example 2) except that an anchor coat layer was not formed, insulating tapes were obtained.

The flexural modulus of the adhesive layers of the thus-obtained insulating tapes and buckling resistance of the tapes are shown in Table 5.

TABLE 5

| Example No. | 6 | 7 | 8 | 9 | 10 | Comp. Ex. 2 |
|---|---|---|---|---|---|---|
| flexural modulus | 500 | 2600 | 7700 | 10600 | 19200 | 420 |
| buckling resistance | ○ | ○ | ○ | ○ | ○ | X | flexural modulus: flexural modulus (kgf/cm²) of polyolefin adhesive layer

Examples 11–15

Comparative Example 3

As a silane-modified polyolefin resin anchor coating agent, silane-modified EEA pellets were extrusion-laminated on a 50 μm thick polyester film by a T-die extruder to form a 10 μm thick anchor coat layer. Meanwhile, adhesive pellets obtained in the same manner as in Example 1 (Example 11), Example 2 (Example 12), Example 3 (Example 13), Example 4 (Example 14), Example 5 (Example 15) and Comparative Example 1 (Comparative Example 3) were laminated in the same manner as in Example 1 to give insulating tapes having a 80 μm thick adhesive layer.

The thus-obtained insulating tapes were examined for the flexural modulus, heat resistance and water resistance of the adhesive layer, adhesiveness of the adhesive layer to metal (conductor) and buckling resistance. The results are shown in Table 6.

The evaluation of the heat resistance, water resistance and adhesiveness of the adhesive layer to metal (conductor) were evaluated as in the following.

Heat resistance

The adhesive layer of an insulating tape was adhered to a rolled copper foil (thickness 50 μm, untreated product) by the heat roll laminating method and cut into 10 mm wide test samples. The laminating conditions were roll temperature 175° C., laminate speed 0.5 mm/min and laminate linear load 6.0 kgf/cm and used were three pairs of 80 mm diameter silicone rubber rolls. The obtained test samples were treated with heat in a gear oven at 135° C. for 168 hours and taken out, after which they were subjected to a 180° peeling test at a speed of 50 mm per min using a stroke graph (R-2 type, manufactured by Toyo Seiki Corp.) to determine peeling strength between the copper foil and the insulating tapes.

Water resistance

The test samples obtained in the same manner as above were placed in hot water (80° C.) and taken out 168 hours later. The samples were subjected to a 180° peeling test at a speed of 50 mm per min using the above-mentioned stroke graph to determine peeling strength between the copper foil and the insulating tapes.

Adhesiveness of the adhesive layer to metal

The test samples obtained in the same manner as above were subjected to a 180° peeling test at a speed of 50 mm per min using the above-mentioned stroke graph to determine peeling strength between the copper foil and the insulating tapes.

TABLE 6

| Example No. | 11 | 12 | 13 | 14 | 15 | Comp. Ex. 3 |
|---|---|---|---|---|---|---|
| flexural modulus | 500 | 2600 | 7700 | 10600 | 19200 | 420 |
| adhesiveness (kg/cm) | 1.99 | 1.92 | 2.10 | 2.05 | 2.00 | 1.55 |
| heat resistance (kg/cm) | 1.32 | 1.64 | 1.53 | 1.40 | 1.71 | 0.70 |
| water resistance (kg/cm) | 2.36 | 2.65 | 2.25 | 2.13 | 1.98 | 0.22 |
| buckling resistance | ○ | ○ | ○ | ○ | ○ | X |
| over-all judgement | ○ | ○ | ○ | ○ | ○ | X | flexural modulus: flexural modulus (kgf/cm²) of polyolefin adhesive layer

As is evident from the results of Table 6, the insulating tapes of Examples 11–15 have high profile in adhesiveness, heat resistance, water resistance and buckling resistance. In contrast, the insulating tape of Comparative Example 3 was inferior in heat resistance, water resistance and buckling resistance.

Examples 16–20

Comparative Example 4

As an anchor coating agent, an alkyl titanate solution (solid content 10% by weight) was applied to a 50 μm thick polyester film with a gravure roll coater to form a 0.1 μm thick anchor coat layer. Meanwhile, adhesive pellets obtained in the same manner as in Example 1 (Example 16), Example 2 (Example 17), Example 3 (Example 18), Example 4 (Example 19), Example 5 (Example 20) and Comparative Example 1 (Comparative Example 4) were laminated in the same manner as in Example 1 to give insulating tapes having a 80 μm thick adhesive layer.

The thus-obtained insulating tapes were examined for the flexural modulus of adhesive layer, adhesiveness of the adhesive layer to metal (conductor), buckling resistance and voltage resistance characteristics. The results are shown in Table 7. For reference, the adhesiveness of the adhesive layer of Comparative Example 3 to metal (conductor), buckling resistance and voltage resistance characteristics are also shown in Table 7.

The voltage resistance characteristics were evaluated as in the following.

Voltage resistance characteristics

Figure 4A:
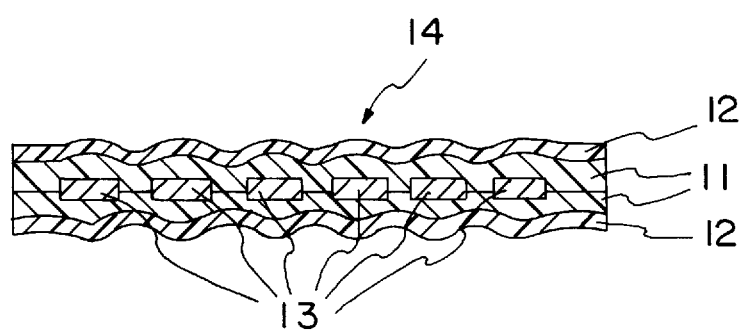
FIG. 4(a) is a cross section of a test sample used for the determination of voltage resistance characteristics and (b) is a plane view thereof.
Figure 4B:
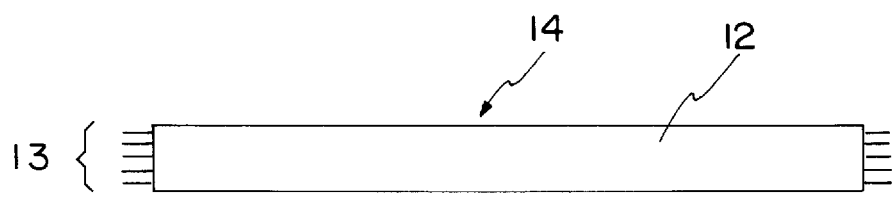
Figure 5:
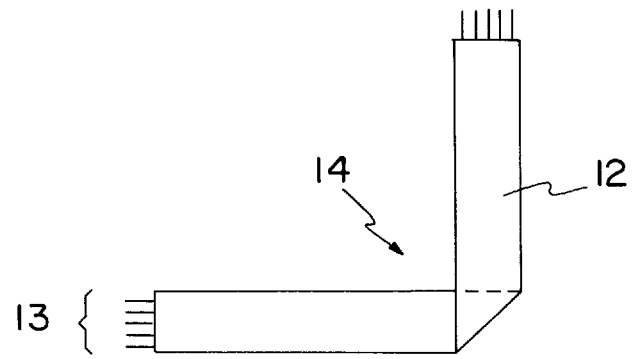
FIG. 5 explains the insulating tape in a folded state in the determination of voltage resistance characteristics.
Figure 6:
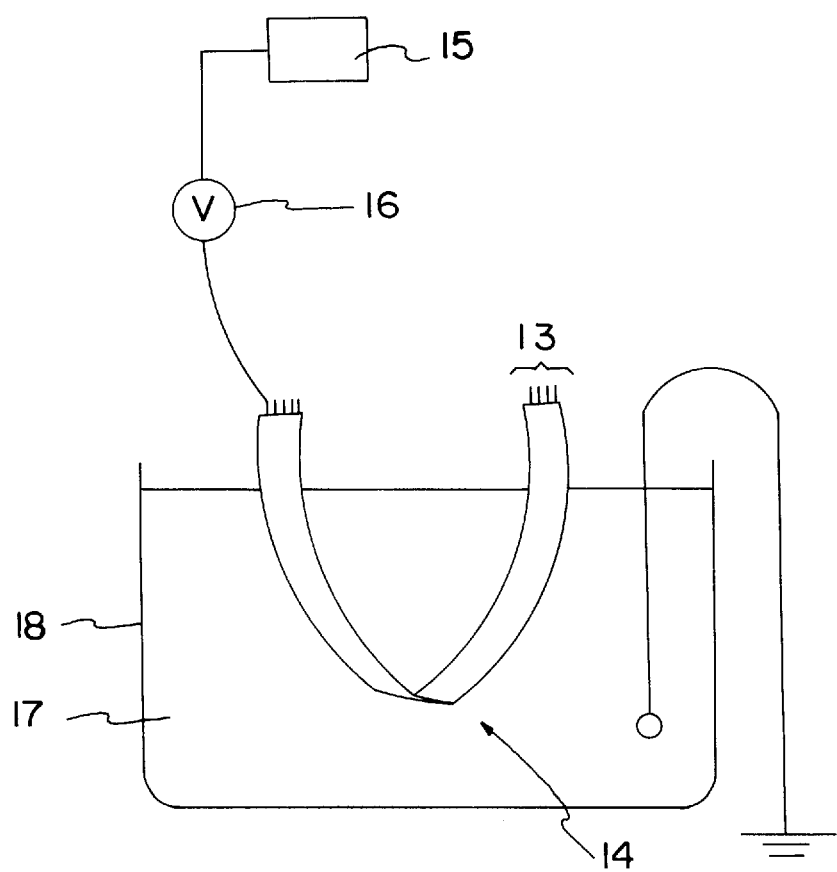
FIG. 6 explains determination of voltage resistance characteristics.

Two insulating tapes and five 120 μm thick, 3 mm width copper wires were laminated at 1 mm distance between the wires to give a flat cable 14 as shown in FIG. 4 for use as a test sample. In FIG. 4, 11 is an adhesive layer, 12 is a polyester film, and 13 is a copper wire. FIG. 4(a) shows a cross section of the flat cable 14 and (b) is a plane view thereof. The flat cable 14 was bent to a right angle and subjected to heat aging at 100° C. for 120 hours in the bent state. Then, the cable was cooled to room temperature and restored to the original shape. As shown in FIG. 6, a 5% brine 17 was filled in a container 18 and the pleat line of the flat cable 14 was soaked in the brine 17. A 1 kv voltage was applied for 1 min from a direct current power supply 15 to the copper wire located at the sidemost position of the copper wire 13. A decrease in the voltage was measured with a voltmeter 16. That is, the voltage becomes low when the brine 17 entered the possible clearance between the copper wire 13 and the adhesive layer 11. Accordingly, the voltage resistance characteristics is expressed by ○ for those which did not show decrease in voltage and X for those which showed decreased voltage. Also, the appearance of the flat cable was observed and expressed by ○ for those which showed no change and X for those which developed color change or cracks.

TABLE 7

| Example No. | 16 | 17 | 18 | 19 | 20 | Comp. Ex. 4 |
|---|---|---|---|---|---|---|
| flexural modulus | 500 | 2600 | 7700 | 10600 | 19200 | 420 |
| buckling resistance | ○ | ○ | ○ | ○ | ○ | X |
| voltage resistance characteristic | | | | | | |
| appearance | ○ | ○ | ○ | ○ | ○ | X |
| insulation | ○ | ○ | ○ | ○ | ○ | X |
| adhesion to copper foil (kg/cm) | 1.20 | 3.00 or more | 2.10 | 1.20 | 1.50 | 1.80 | flexural modulus: flexural modulus (kgf/cm$^2$) of polyolefin adhesive layer

INDUSTRIAL APPLICATION

The insulating tape of the present invention is preferably used for electric wiring in electric equipments, electronic equipments and automobiles, and indoor and outdoor wirings. In particular, it is preferably used for a flat cable to be used for electric wiring in automobiles.

What is claimed is:

1. A method of electrically insulating wire in electric wiring of automobiles, which comprises covering the wire with an insulating tape or sheet comprising (1) a polyester layer, (2) a polyolefin adhesive layer having a flexural modulus of 500–20,000 kgf/cm$^2$, and (3) an anchor coat layer between the polyester layer and the polyolefin adhesive layer, wherein the anchor coat layer comprises a silane-modified polyolefin or an organic titanium compound as a main component, to provide insulated wire.

2. The method of claim 1, wherein the insulated wire is a flat cable.

3. The method of claim 1, wherein the polyolefin adhesive is a member selected from the group consisting of (1) an ethylene copolymer, (2) a polyethylene grafted with a carboxylic acid, (3) a polyethylene grafted with a carboxylic acid anhydride, (4) a polypropylene grafted with a carboxylic acid, (5) a polypropylene grafted with a carboxylic acid anhydride, (6) a grafted copolymer of an ethylene copolymer with an alkoxysilane, (7) a grafted copolymer of an ethylene copolymer with an unsaturated carboxylic acid, (8) a grafted copolymer of an ethylene copolymer with an unsaturated carboxylic acid anhydride, and (9) a grafted copolymer of an ethylene copolymer with an ionomer.

4. The method of claim 1, wherein the flexural modulus of the polyolefin adhesive layer is 1,500–15,000 kgf/cm$^2$.

5. The method of claim 4, wherein the flexural modulus of the polyolefin adhesive layer is 2,500–10,000 kgf/cm$^2$.

6. An insulated wire comprising a conductor, a polyester layer, a polyolefin adhesive layer having a flexural modulus of 500–20,000 kgf/cm$^2$ interposed between the conductor and the polyester layer, and an anchor coat layer between the polyester layer and the polyolefin adhesive layer, wherein the anchor coat layer comprises a silane-modified polyolefin or an organic titanium compound as a main component.

7. The insulated wire of claim 6, which is a flat cable.

8. The insulated wire of claim 6, wherein the polyolefin adhesive is a member selected from the group consisting of (1) an ethylene copolymer, (2) a polyethylene grafted with a carboxylic acid, (3) a polyethylene grafted with a carboxylic acid anhydride, (4) a polypropylene grafted with a carboxylic acid, (5) a polypropylene grafted with a carboxylic acid anhydride, (6) a grafted copolymer of an ethylene copolymer with an alkoxysilane, (7) a grafted copolymer of an ethylene copolymer with an unsaturated carboxylic acid, (8) a grafted copolymer of an ethylene copolymer with an unsaturated carboxylic acid anhydride, and (9) a grafted copolymer of an ethylene copolymer with an ionomer.

9. The insulated wire of claim 6, wherein the flexural modulus of the polyolefin adhesive layer is 1,500–15,000 kgf/cm$^2$.

10. The insulated wire of claim 9, wherein the flexural modulus of the polyolefin adhesive layer is 2,500–10,000 kgf/cm$^2$.

* * * * *